April 22, 1958  L. G. BOUGHNER  2,831,372
VEHICLE DRIVE MECHANISMS
Filed Dec. 28, 1953  5 Sheets-Sheet 1
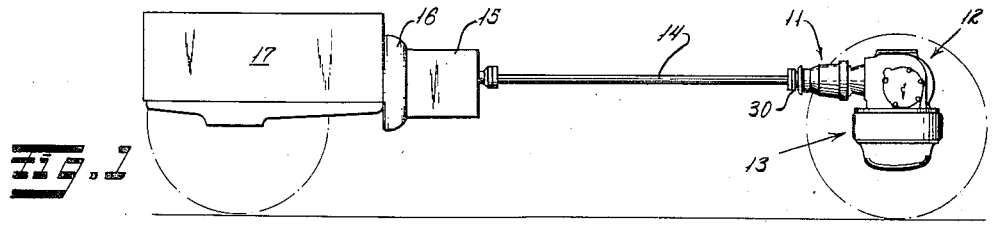
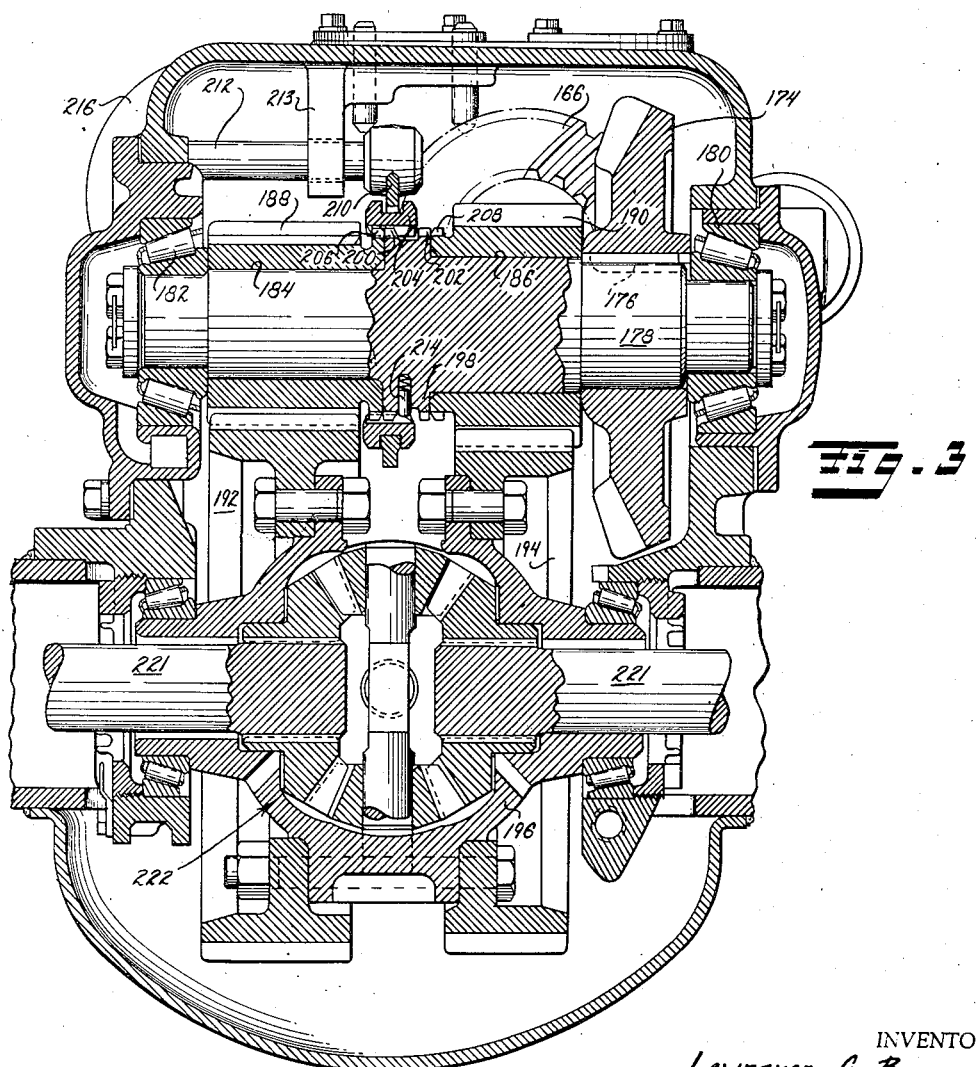
INVENTOR
LAWRENCE G. BOUGHNER
BY Strauch, Nolan & Diggins
ATTORNEYS

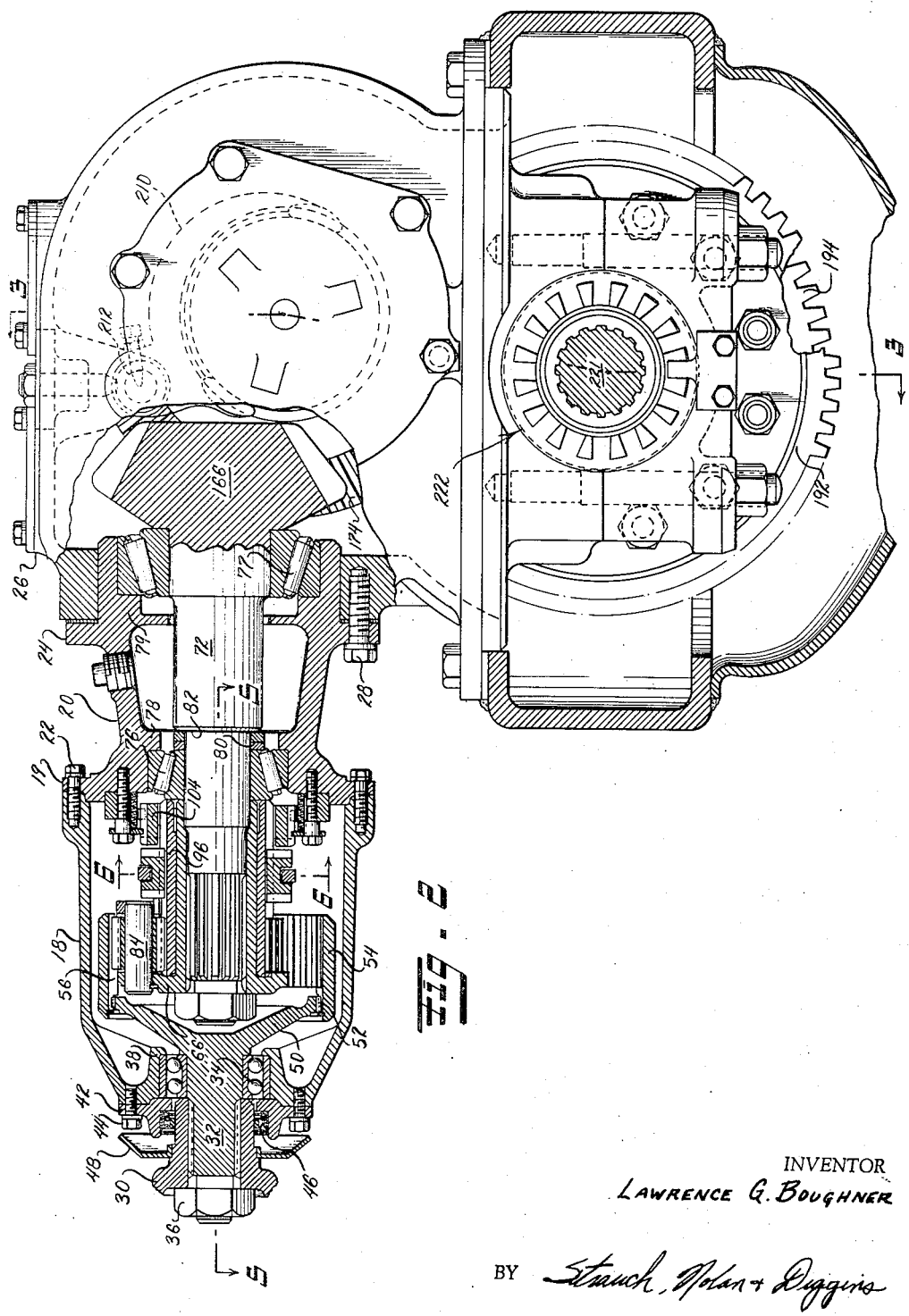

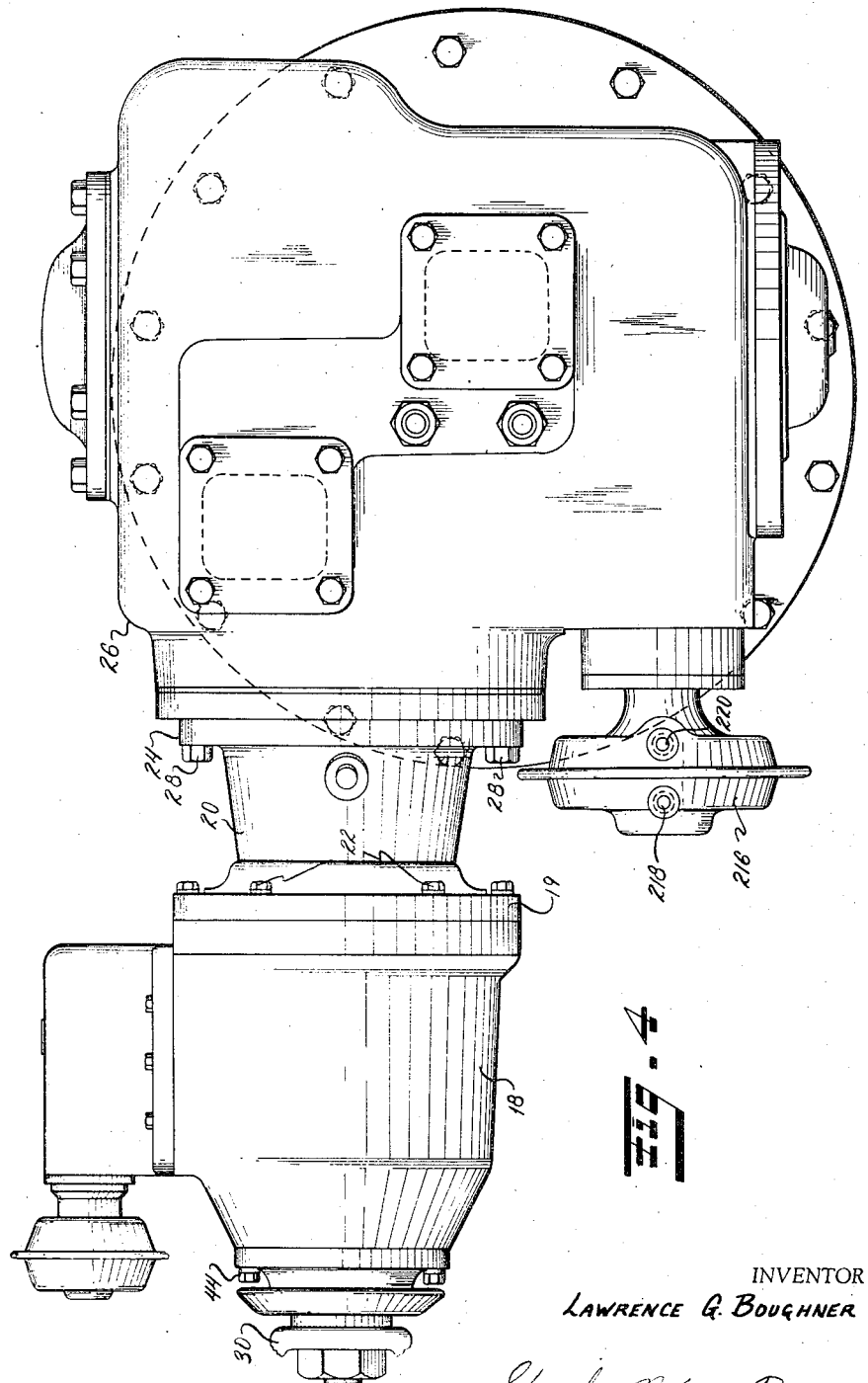

April 22, 1958  L. G. BOUGHNER  2,831,372
VEHICLE DRIVE, MECHANISMS
Filed Dec. 28, 1953  5 Sheets-Sheet 4

INVENTOR.
LAWRENCE G. BOUGHNER
BY
ATTORNEYS

April 22, 1958 — L. G. BOUGHNER — 2,831,372
VEHICLE DRIVE MECHANISMS
Filed Dec. 28, 1953 — 5 Sheets-Sheet 5

INVENTOR.
LAWRENCE G. BOUGHNER
BY Strauch, Nolan & Diggins
ATTORNEYS

United States Patent Office 2,831,372
Patented Apr. 22, 1958

2,831,372

VEHICLE DRIVE MECHANISMS

Lawrence G. Boughner, Detroit, Mich., assignor to Rockwell Spring and Axle Company, Coraopolis, Pa., a corporation of Pennsylvania Application December 28, 1953, Serial No. 400,473

18 Claims. (Cl. 74—700)

This invention relates to vehicle drive mechanisms and more praticularly to means for substantially increasing the speed range of multi-speed vehicle transmissions.

Multi-speed vehicle drive axles of the type disclosed by United States Patent 2,480,836 issued to L. R. Buckendale have met with wide acceptance and success. The provision of such axles on vehicles greatly increases the usefulness of the vehicle to which they are applied by permitting operation at high speeds under normal highway conditions with low engine speeds, for greater fuel economy, and at a much lower speed than conventional axles when rough terrain is encountered, for greater tractive force; without the necessity of declutching the conventional engine-clutch-transmission drive train. As a result the operator has complete control of the vehicle and is able to shift the vehicle to the most desirable operating conditions with a great deal of ease for efficient operation at all times.

The present invention embodies certain improvements over known multi-speed drive axles to increase the number of selectable operating gear ratios of such multi-speed axles for increased vehicle efficiency, by means of interrelating a novel shiftable planetary transmission with the multi-speed drive axle. In the present invention, the transmission unit which assures ease and smoothness of shifting while maintaining a high degree of response to shifting operation is a compact lightweight unit that is interrelated with a conventional multi-speed drive axle with a minimum overhang with respect to the axle supporting it, and which involves a minimum of expense in the manufacture and adaption to conventional multi-speed axles.

An important object of this invention is to provide an improved vehicle drive train adapted to provide a large number of indivdually selectable speed ratios between the engine crank shaft and the ground engaging wheels even with a conventional three speed transmission.

In furtherance of the foregoing object, it is a further important object of this invention to provide an improved multiple speed vehicle drive axle embodying a casaded series of speed ratio selection stages between the engine driven input shaft and the differential mechanism thereof.

A further object of this invention is to provide an improved shiftable multi-speed transmission adapted to be mounted on conventional multi-speed vehicle drive axles.

It is a further object of this invention to provide a novel two speed planetary transmission unit adapted to be mounted on conventional multi-speed drive axles to substantially increase the operating speed ratios of a vehicle and substantially descreasing the size and complexity of the conventional clutch-control vehicle transmission.

These and other objects of this invention will become more fully apparent by reference to the appended claims and as the following detailed description proceeds in reference to the accompanying drawings wherein:

Figure 2 is a side view, partially in section of a multiple speed drive axle embodying the principles of the present invention;

Figure 3 is a sectional view taken substantially along the line 3—3 of Figure 2;

Figure 4 is a top plan view of the drive axle assembly of Figure 2;

Figures 7, 7A and 7B, 8, 8A and 8B, and 9, 9A and 9B illustrate respectively three positions of the clutch collar assembly in moving from one position of clutch engagement to the other.

Figure 1A:
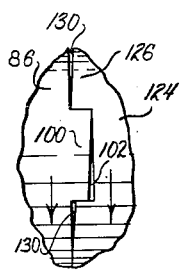
Figure 1 is a diagrammatic illustration of a vehicle drive train.
Figure 1:
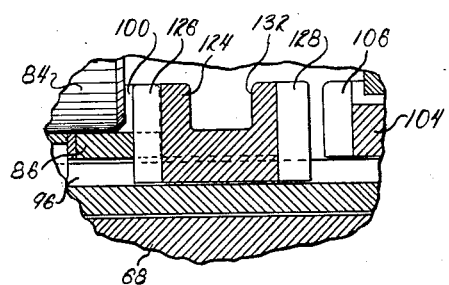
Figure 1B:
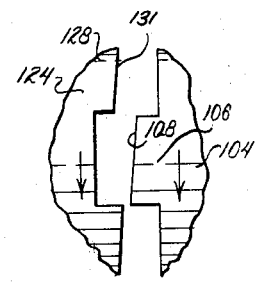

Referring now to the drawing and particularly to Figures 1 and 2, a novel two-speed planetary transmission 11 embodying the principles of this invention is operatively connected to and unitarily mounted as a sub-assembly on the nose of a housing 12 of a two-speed drive axle 13 and universally drive connected by a propeller shaft 14 to the output shaft of a conventional three speed transmission 15 driven through a conventional clutch assembly 16 from an engine 17.

The present invention increases the number of selectable speed ranges of multi-speed drive axles by operatively interposing improved two-speed planetary transmission 11 between the propeller shaft 14 and the input of a conventional two speed double reduction differential drive mechanism to effectively double the ratios of the drive axle.

Referring now to Figures 2 and 4, the novel two-speed planetary transmission of this invention comprises a housing 18 fixed at one end to the end flange 19 of the bearing cage or housing 20, as by bolts 22. Integral flange 24 of bearing cage 20 axially spaced from flange 19 is secured to the nose of differential housing 26 by a plurality of circumferentially disposed bolts 28. It will be readily seen by reference to Figure 2 that bearing cage 20 and planetary transmission housing 18 together with the parts mounted therein form essentially an integral sub-assembly which can be selectively assembled and disassembled on the nose of differential housing 26.

A detailed description of the two-speed planetary transmission 11 and its interrelation with the two-speed differential drive mechanism will first be given and then a description of the actuation of both the shiftable planetary transmission and two-speed differential transmission, their interrelation, and the speed ranges possible with the novel association of the two multi-speed transmissions of this invention will then be described.

The engine driven propeller shaft 14 which extends from the usual vehicle engine-clutch-transmission power plant 15, 16, 17 is connected to flange coupling 30 splined upon input shaft 32 to transmit driving torque thereto, as shown in Figure 2. The inner race of a dual ball bearing 34 is clamped upon and against an integral shoulder of shaft 32 by nut 36 and coupling 30. Bearing 34 supports shaft 32 in housing 18 and is axially restrained thereon between integral internal shoulder 38 of housing 18 and integral internal shoulder 40 of retaining cover member 42, which is fixed to the outer or forward end of housing 18 by bolts 44. Seal 46 is fitted in coacting engagement with coupling 30 and cover member 42 in abutting contact with the exterior surface of shoulder 40, and is protected from foreign matter by dished baffle member 48 press fitted on the hub of coupling 30 with its concave surface adjacent the exposed end of seal 46.

At the inner end of shaft 32 there is formed an enlarged dished shaped integral flange 50 having peripheral splines 52 which non-rotatably mount internally toothed ring gear 54. The ends of the teeth 56 of ring gear 54 adjacent flange 50 are cut away as at 58 to interfit with splines 52 and provide a flat abutting shoulder 60 abutting a flat axially facing surface 62 of flange 50. Snap ring 64 internally mounted in ring gear 54 abuts the end faces of the splines 52 opposite surface 62 to hold ring gear 54 in axial assembly on flange 50.

Integral axially extending hub 68 of planetary gear carrier 66 is provided with internal splines 70 which are complementary to and drivingly engage splines on an adjacent end of pinion shaft 72. Carrier 66 is maintained on pinion shaft 72 in abutting engagement at one end with nut 74, threadedly on the reduced end of pinion shaft 72, and in abutting engagement at the other end with the inner race of tapered roller bearing 76.

As is shown in Figure 2, pinion shaft 72 is rotatably supported in bearing cage 20 by opposed tapered roller bearings 76 and 77 which are mounted in cage 20 with their outer races in abutting contact with adjacent faces of integral internal shoulders 78 and 79, respectively. The right hand face of the inner race of bearing 76 abuts spacer washers 80 interposed between the inner race and integral shoulder 82 of pinion shaft 72. Washers 80 serve to properly axially locate bearing 76 and carrier 66 relative to pinion shaft 72.

Planetary gear shafts or spindles 84 (Figures 2 and 5) press fitted at one end into a plurality of circumferentially disposed equiangularly spaced bores in carrier 66 are slip fitted at their opposite ends into respective axially aligned bores in axially spaced clutch ring 86 and are axially restrained by external snap ring 88 mounted in spindle 84 in abutting relation with an adjacent face of carrier 66. Clutch ring 86 rotates with and is part of the planetary gear carrier 66.

A plurality of needle bearings 90 disposed about the periphery of each spindle, between carrier 66 and clutch ring 86, freely rotatably mount planetary gears 92 in bearing contact at opposite ends with spaced thrust washers 94 and 95. As is clearly shown in Figures 2 and 5, planetary gears 92 are intermediate and in constant mesh with both ring gear 54 and sun gear 96. Sun gear 96 is coextensive in length with carrier hub extension 68 and is rotatably supported thereon at its end adjacent bearing 76 by needle bearings 98 disposed about hub 68. The single end support of sun gear 96 on bearings 98 permits a limited degree of radial or lateral floating of sun gear 96 so that the sun gear may seek its own center of rotation with respect to planetary gears 92 to thereby assure uniform loading.

Figure 5:
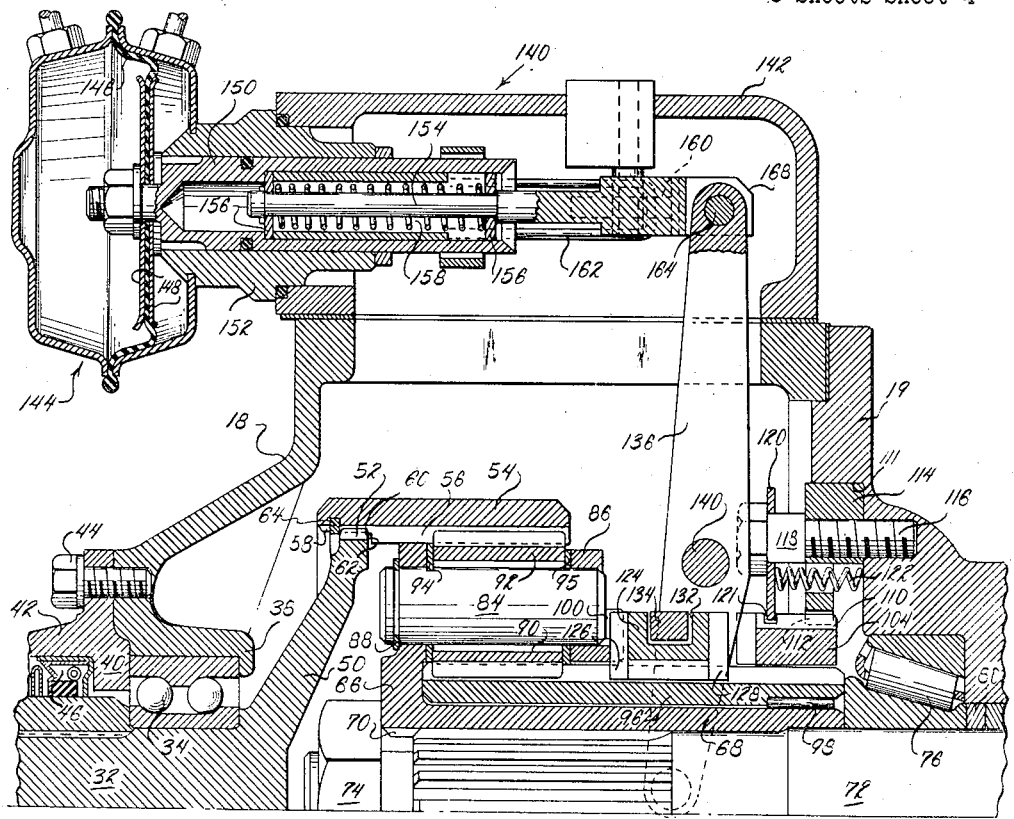
Figure 5 is a fragmentary horizontal sectional view taken along the line 5—5 of Figure 2.

Clutch ring 86 is provided at its inner end with a series of circumferentially disposed axially extending teeth 100 (Figures 7 through 9A) having inclined end faces 102, as more fully described in copending application Serial No. 330,441. A similar toothed ring 104 is mounted in axially spaced relation to clutch ring 86 and is provided with axially directed brake teeth 106 facing teeth 100, and having inclined end faces 108. As shown in Figure 5, non-rotatable annular brake ring 104 is provided on its outer periphery with splines 110 which drivingly engage splines 112 of ring 114 non-rotatably mounted in bore 111 of flange 19 by bolts 116. The heads of bolts 116 are held in spaced relation to an adjacent face of ring 114 by sleeves 118 coaxially mounted on bolts 116 and which slidably mount a circular spring pressure plate 120 which has internal teeth which mate with the teeth on brake ring 104, are assembled over the teeth on brake ring 104 until groove 121 is reached, turned one half a tooth space and bolted in place with bolts 116. This locks plate 120 and ring 104 for axial displacement together. A plurality of coil springs 122 are suitably mounted in a plurality of circumferentially disposed bores in ring 114 radially inwardly of bolts 116 and are in abutting engagement at opposite ends with a face of flange 19 and pressure plate 120. Springs 122 exert a biasing force on plate 120 which is transmitted to clutch ring 104 to bias the clutch ring 104 toward the left in Figures 2 and 5. Pressure plate 120 is slidable on sleeves 118 between the head of bolts 116 and the adjacent face of ring 114.

Figure 6:
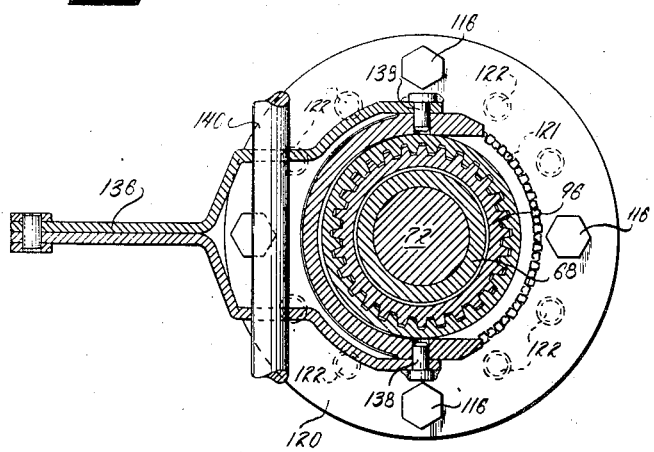
Figure 6 is a fragmentary transverse section taken along the line 6—6 of Figure 2.

Toothed collar 124 (Figures 5 and 7 through 9B) slidably splined on the teeth of sun gear 96 intermediate rings 86 and 104 is provided on opposite faces with axially directed coupling teeth 126 and 128 whose end faces are inclined as at 130 and 131, respectively. Collar 124 is selectively shiftable to alternately engage teeth 100 and 126 or teeth 128 and 106. The illustrated type of coupling teeth are known as Maybach teeth and are more fully described in United States Letters Patents 2,049,126 and 2,049,127 and copending application Serial No. 330,441 to which reference is made for further detail. Peripheral groove 132 provided on the outer periphery of collar 124 intermediate teeth 126 and 128 receives with a sliding running fit a semi-circular actuating ring 134 (Figures 5 and 6).

A fork 136 pivotally connected at diametrically opposite sides to the actuating ring, as at 138, is pivotally mounted intermediate its ends on pivot shaft 140 mounted in housing 18. It will be readily seen that counterclockwise movement (Figure 5) of fork 136 will cause teeth 106 and 128 to engage and clockwise movement of fork 136 will cause teeth 100 and 126 to engage.

The actuating mechanism 140 for the novel shiftable planetary transmission is supported on a hollow housing 142 which is secured to and closes one side of housing 18, as shown in Figure 5. The actuating mechanism 140, which is substantially the same as that disclosed in Serial No. 330,441, comprises a diaphragm chamber defining housing 144 between the separable halves of which is mounted a diaphragm 146 dividing housing 144 into two separate fluid tight compartments. Diaphragm 146 is clamped between pans 148 which are fixed to shift member 150 slidably mounted in fluid tight relation in support member 152 secured in housing 142. Shift member 150, which is slidable in support member 152, in turn slidably supports rod 154 mounted on washers 156. Compression spring 158, mounted on rod 154 between washers 156, biases the washers into abutting contact with respective shoulders and snap rings of shaft member 150 and shift rod 154, as more fully described in Serial No. 330,441. A pair of pivotally mounted pawls 160 pivotally mounted in housing 142 and controlled by retaining members 162 operatively alternately engage shoulders of shift rod 154 to maintain the shift rod in alternate predetermined positions which are the high speed and low speed drive conditions of the planetary transmission, respectively. The end of rod 154 is provided with spaced arms 168 which are bifurcated to engage a cross pin 164 at the end of shifter fork 136 so that shifting movements of rod 154 are transmitted to collar 124 by fork 136.

As shown in Figures 2 and 3, hypoid pinion 166 integral with shaft 72 is in constant mesh with drive gear 174 drivingly mounted as by key 176, or other means, on cross shaft 178 rotatably mounted on differential carrier housing 12. Cross shaft 178 is provided with reduced end journal portions received in the inner races of bearings 180 and 182 and between these journal portions has additional journal portions 184 and 186 upon which are freely journaled respective spur gears 188 and 190 which mesh with gears 192 and 194, respectively, fixed to the opposite sides of rotatably mounted differential cage 196. Between journal portions 184 and 186 shaft 178 is provided with an integral enlarged portion 198 having axially spaced rows 200 and 202 of external teeth which engage internal teeth of clutch collar 204.

Gear 188 is provided with clutch teeth 206 axially spaced from the adjacent end of the gear teeth, and gear 190 is similarly provided with teeth 208 axially spaced from the adjacent end of its gear teeth.

Clutch collar 204 is axially shiftable to engage gear 188 and shaft 178 through spline teeth 200 and 206, or gear 190 and shaft 178 through spline teeth 202 and 208, so that either one of the gears, 188 or 190, may be selectively coupled for rotation with shaft 178. Clutch collar 204 is provided with an annular external groove to receive engaging portion of a clutch shifting collar or yoke 210 operatively connected to selectively axially shiftable rod 212 so that shifting movements of rod 212 are imparted to clutch collar 204 through yoke 210. Cross shaft 178 carries a plurality of spring pressed detents 214 which engage with specially beveled ends of the aligned teeth in the clutch collar 204 to retain the clutch collar in the selected one of two operative positions selectively clutching either gear 188 or 190 to shaft 178.

Selectively shiftable rod shaft 212 axially slidable in support 213 is operatively connected through a pivotally mounted bell crank to a reciprocable rod, movable under control of the diaphragm of fluid motor 216 (Figure 4).

Movement of flexible diaphragm of fluid motor 216 is effected through the creation of pressure differentials between opposite sides of the diaphragm by selectively connecting one side of the diaphragm or the other to the engine intake manifold through fluid fittings 218 and 220 to create a vacuum on one side or the other of the diaphragm.

With clutch collar 204 drivingly connecting gear 188 to shaft 178, low speed rotation of pinion 72 is imparted to axles 221 through drive gear 174, gear 188 and gear 192 fixed to differential cage 196 which houses a conventional bevel gear differential mechanism 222 for imparting differential drive to axle shafts 221. Clutching engagement of collar 204 with gear 190 imparts high speed driving rotation to axle shafts 221 through the gear train defined by pinion 72, drive gear 174, gears 190 and 194.

The foregoing described two speed differential drive axle is more fully described in United States Letters Patent 2,480,836 issued to L. R. Buckendale to which reference is made for further details of construction of the presently described two speed drive axle.

The foregoing described conventional two speed axle increases the operating range of normal vehicles by providing two additional speed ratios available to the drive axles without the necessity of declutching of the conventional vehicle transmission (not shown). With the addition of the novel mounting of the improved planetary two speed transmission on the nose of the two speed differential drive axle, it will be readily appreciated that the effective speed range of the two speed drive axle is increased, that is, instead of merely having two speeds available through the two speed drive axle the speeds available are doubled or increased to four speed ratios available to the operator without the necessity of declutching the conventional vehicle transmission to shift from one drive speed to another.

Figure 8A:
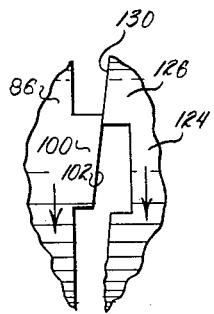
Figure 8:
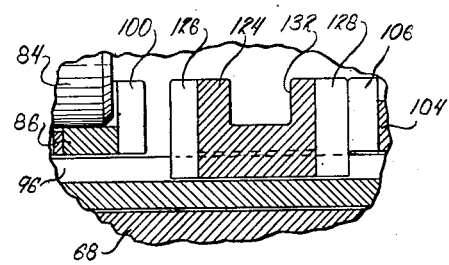
Figure 8B:
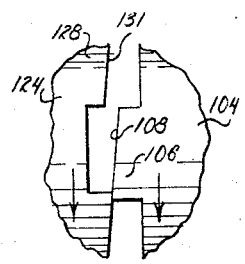
Figure 9A:
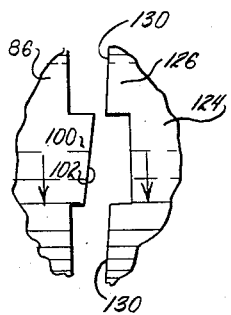
Figure 9:
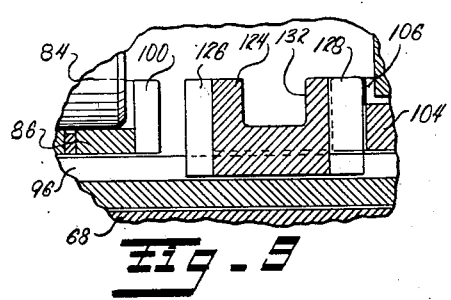
Figure 9B:
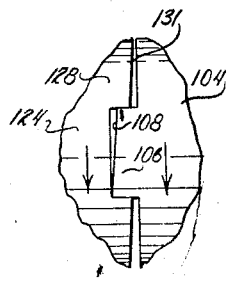

The manner of operation and means of shifting from one drive condition to the other of the planetary two speed transmission will first be described, and then the manner of operation and means of effecting shifting from high to low speed drive of the two speed axle will be described. The interrelation and combination of speed ratios available will then become readily apparent. With regard to the manner of operation of the novel two speed planetary transmission there is shown in Figures 7, 7A and 7B, 8, 8A and 8B, and 9, 9A and 9B, three conditions or phases of operation. Figures 7, 7A and 7B show the unit in the direct drive high speed condition while Figures 9, 9A and 9B show the unit in the low speed or underdrive condition. The condition illustrated by Figures 8, 8A and 8B is a transition position that momentarily exists during the shifting between direct drive and underdrive, but it is not a neutral position and is herein disclosed only to clarify the operation of the invention.

For ease of explanation the operation of the gearing in direct and low or underdrive condition will be first explained and later the means of actuating the clutch mechanism to obtain these drive conditions will be explained.

Referring to Figures 7, 7A and 7B, where there is a direct drive position of the planetary transmission, collar teeth 126 are engaged with teeth 100 of clutch ring 86; and ring gear 54, planet gears 92 and sun gear 96 are constantly in mesh. By virtue of the position of collar 124, there is a rigid connection between ring gear 54 and sun gear 96 so that rotation of shaft 32 will unitarily rotate ring gear 54, planet gears 92, sun gear 96 and collar 124 about the axis of shaft 32, and planet gears 92 will not be permitted to rotate about their spindles 84. Since the planet gears are restrained from rotation, there is a direct drive between shafts 32 and 72.

When collar 124 is shifted to the right, as viewed in Figures 9, 9A and 9B so that clutch collar teeth 128 engage teeth 106 of ring 104, there is speed reduction between shafts 32 and 72. In this condition sun gear 96 is held stationary with respect to the axis of shaft 32 by virtue of the rigid connection between sun gear 96, collar 124 and stationary ring 104 secured to flange 19 of bearing cage 20. Therefore, rotation of shaft 32 will cause ring gear 54 to rotate, and since sun gear 96 is held in a non-rotative condition, by virtue of its splined connection with collar 124, planet gears 92 are forced to rotate about their own axes and also about sun gear 96. The rotation of planet gears 92 about sun gear 96 is imparted to carrier 66 from whence it is imparted to pinion shaft 72 through the spline connection 70 of carrier 66 and pinion shaft 72 to result in the underdrive condition.

A description of the shifting movements of collar 124 from the direct drive condition of Figures 7, 7A and 7B to the underdrive condition of Figures 9, 9A and 9B will now be given.

The operator preselects the desired drive condition, which in this instance will be to attain the underdrive condition, moving from the condition of Figures 7, 7A and 7B to the condition of Figures 9, 9A and 9B, by suitable control means, not shown, which effects the creation of a vacuum on the left hand side of diaphragm casing 144 as viewed in Figure 5. A vacuum is created on the left side of the diaphragm and the pressure on the right acts to force diaphragm 146 and shift member 150 together towards the left, which compresses spring 158. Leftward movement of shift member 150 causes the ends of retaining springs 162, which are mounted for movement with member 150, to ride up the inclined surfaces of pawls 160. Springs 162 pass from the inclined surface on one side of the pawls to the inclined surface on the other side of the center of the pivot upon which the pawls are mounted, pawls 160 are caused to rotate out of engagement with the shoulder of shift rod 154 which immediately frees rod 154 for axial movement to the left. However rod 154 will remain motionless during the axial movement of shift member 150 because of driving torque engagement between engaged clutch teeth 126 and 100 as more fully described in copending application Serial No. 330,441. The operator now releases the accelerator pedal thereby relieving the driving torque between clutch teeth 126 and 100 and then spring 158 expands to shift collar 124 to the right to disengage teeth 126 and 100 and move collar 124 to the transition stage of Figures 8, 8A and 8B.

As clutch collar 124 passes from the direct drive condition of Figures 7, 7A and 7B into the transition stage of Figures 8, 8A and 8B, the collar 124 is rotating relative to the stationary clutch ring 104. It is therefore necessary to stop rotation of collar 124 in order to have smooth engagement of teeth 128 and 106. In order to stop rotation of collar 124 the operator again depresses the accelerator pedal of the vehicle once the collar has passed into the transition stage, which causes the engine to speed up again. The speeding up of the engine will cause shaft 32 and ring gear 54 to speed up faster than carrier 66 and pinion 72, and planetary gears 92 will cause sun gear 96 and consequently collar 124 to slow down relative to ring gear 54 and shaft 32.

It should be noted at this point that there is no neutral position for collar 124, the shift from toothed driving engagement of the direct drive condition of Figures 7, 7A and 7B to the toothed driving engagement of underdrive condition of Figures 9, 9A and 9B passing through the transition state of Figures 8, 8A and 8B with tooth ends 131 and 103 ratcheting over one another until synchonous engagement of collar 124 with brake ring 104 is effected.

As shown in Figures 7 through 9B teeth 100 of clutch ring 86 are inclined as at 102 and teeth 106 of brake ring 104 are similarly inclined as at 108. Also teeth 128 and 126 complementary with teeth 100 and 106, respectively, are also similarly inclined as at 131 and 130, in the manner of Maybach teeth more fully described in United States Letters Patents 2,049,126 and 2,049,127 to which reference is made for further details. This biasing of the respective coupling teeth together with the resilient backing of brake ring 104, permits a limited degree of axial movement of brake ring 104 while teeth 128 ratchet or rotate in relative rubbing contact past teeth 106, in one direction only which is the same as the direction of rotation of the input and output shafts. Since there is no neutral position, teeth 100 and 126 will also momentarily at the time of transition be ratcheting relative to each other by virtue of their respective end surface inclines. When collar 124 reaches a condition of non-rotation relative to brake ring 104 teeth 126 and 106 will smoothly mesh under the biasing force of spring 158 and springs 122. Reverse rotation of collar 124 relative to brake ring 104 is impossible since the moment synchronization occurs the side face of the high point of teeth 126 will abut the side face of the high point of teeth 106 preventing reverse relative rotation, thereby assuring smooth positive engagement of teeth 126 and 106.

As heretofore noted, the resilient backing of brake ring 104 by springs 122 which biases brake ring 104 toward the left as viewed in Figures 2 and 5 together with the slidable spline mounting of ring 104 in stationarily mounted ring 114 permits the ratcheting of teeth 126 relative to teeth 106, since ring 104 will be forced toward the right as the high points of teeth 126 and 106 approach each other and will be immediately biased to the left by the springs after the high points have passed each other. This novel mounting of brake ring 104 and the biasing of the respective coupling teeth assures maximum smoothness and positive operation of the coupling unit.

In shifting from underdrive of Figures 9, 9A and 9B to direct drive of Figures 7, 7A and 7B, the operator again preselects the desired shifting operation which causes a creation of vacuum on the right hand side of diaphragm 146 which forces the diaphragm and shift member 150 together toward the right. The sequence of movement of diaphragm 146, shift member 154, retaining springs 162 and the action of pawls 150 is the converse of that described in shifting from direct drive to planetary drive.

Once the operator has preselected the desired shifting sequence he takes his foot off the accelerator pedal whereby relieving the frictional engagement of teeth 106 and 126 and then spring 158 becomes effective to shift collar 124 through actuating arm 136 to the left to disengage teeth 106 and 126 and move the collar 124 into the transition stage.

In shifting from underdrive of Figures 9, 9A and 9B to direct drive of Figures 7, 7A and 7B, the operator does not in this instance depress accelerator to again speed up the engine after a preselected shifting movement but rather keeps his foot off the accelerator which causes the engine to slow down. This slowing down of the engine causes shaft 32 and ring gear 54 to slow down to the rotational speed of carrier 56 which in turn causes planet gears 92 to rotate sun gear 96 and consequently collar 124 from no rotation up the speed of clutch ring 86. Here again as described in shifting from direct drive to planetary drive collar 124 is ratcheting past the teeth in clutch ring 86 and brake ring 104, under the biasing effect of springs 122 and here again as in the previously described shifting movement there will be relative rotational movement in one direction and only one direction of teeth 126 relative to teeth 100, with the rotation being in the direction of rotation of the input and output shafts. When clutch ring 86 and collar 124 become synchronized, teeth 126 will smoothly engage teeth 100 under the biasing force of spring 158 and springs 122. Sun gear 96 will not be able to turn faster than clutch ring 86 in the one direction of collar 124 and sun gear 96 rotation permitted during the shift transition state because just as soon as the sun gear attempts to rotate faster the side faces or high points of teeth 126 will abut the side faces of the high points of teeth 100 and prevent such reverse rotation, thus assuring positive and smooth meshing engagement of teeth 126 and 100, at all times.

If after preselecting direct drive, and letting up on the accelerator, the accelerator should be depressed before teeth 100 and 126 have become meshed the transmission will automatically slip back from the transition stage of Figures 8, 8A and 8B toward the underdrive condition of Figures 9, 9A and 9B, so that the long sides of the teeth 128 and 106 are imparted engagement but so that the corners of the short sides of the teeth 106 and 128 will clear. However, once teeth 100 and 126 have become meshed in direct drive such an acceleration will not cause a slippage to underdrive and the frictional engagement of the teeth while transmitting the driving torque will not permit the teeth to become disengaged.

The foregoing description clearly sets forth the manner in which the engine driven propeller shaft can transmit direct driving power or low speed driving power to input pinion 72 of the differential drive mechanism. The power put into pinion 72 can then be selectively increased or decreased through the novel two speed type differential drive mechanism herein disclosed, and the operation of which is fully described in United States Letters Patent 2,480,836.

From the foregoing it will be readily seen that I have invented a simple novel multi-speed transmission wherein the usual speed ratios available from a two speed differential drive axle are materially increased by the addition of a novel mounting of an automatically controlled two speed planetary transmission to thereby materially increase the operating ranges available to the operator without the necessity of declutching the conventional vehicle transmission type drive. The mechanism by reason of its compactness, rigidity and strength may be placed in any type of multi-speed drive train now known in the art to materially increase the driving ranges of drive axles to thereby give the operator a greater degree of control over the operations of the vehicle under all driving conditions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are intended to be embraced therein.

What is claimed and desired to be secured by United States Letters Patent is:

1. In combination with a multi-speed drive axle including a housing, a differential and a selectively shiftable multi-speed drive for said axle differential within said housing, a two piece casing detachably secured together; a drive shaft rotatably mounted in one portion of said casing; a driven shaft rotatably mounted in the other portion of said casing in axial alignment with said drive shaft; a variable speed transmission associated with said shafts; spaced toothed members operatively associated with said tranmission; selectively movable toothed coupling means alternately engageable with said spaced toothed members to connect said shafts in different speed ratios; said casing being unitarily connected to said housing through said other portion to permit connection of said driven shaft to said multi-speed drive.

2. In a vehicle drive axle, an axle housing; a differential journalled in said housing, a cross shaft in said housing mounted in a plane parallel to the axis of said differential; a casing secured to said housing; a pinion shaft rotatably mounted in said casing at an angle to said cross shaft; gearing within said housing providing a double reduction selective two speed drive between said pinion shaft and said differential; a drive shaft rotatably mounted in said casing in alignment with said pinion shaft; and planetary gearing within said casing providing a plurality of selective speed ratios between said drive shaft and pinion.

3. In a vehicle drive axle, an axle housing; a differential journalled in said housing, a cross shaft in said housing mounted in a plane parallel to the axis of said differential; a casing secured to said housing; a pinion shaft rotatably mounted in said casing at an angle to said cross shaft; gearing within said housing providing a double reduction selective two speed drive between said pinion shaft and said differential; a drive shaft rotatably mounted in said casing in alignment with said pinion shaft; gearing within said casing providing a plurality of selective speed ratios between said drive shaft and pinion to increase the speed ratios at which said differential means can be driven, said casing, drive shaft, pinion shaft and associated gearing unitarily mountable and demountable on said housing.

4. In a vehicle drive axle, an axle housing; a differential journalled in said housing, a rotatable cross shaft in said housing mounted in a plane parallel to the axis of said differential; a casing detachably secured to said housing; a pinion shaft rotatably mounted in said casing at an angle to said cross shaft; spaced gears within said housing freely rotatably mounted on said cross shaft and operatively connected to said differential defining a selective two speed drive between said pinion and differential; a selectively movable clutch ring operative to selectively connect said spaced gears to said cross shaft to impart rotation of said cross shaft through the connected gear to said differential means; a drive shaft rotatably mounted in said casing; a planetary transmission operatively connecting said drive and pinion shafts and comprising axially spaced toothed coupling members; and a rotatable toothed coupling collar selectively movable to alternative engagement with said spaced toothed coupling members to connect said drive and pinion shafts in different speed ratios.

5. The device as set forth in claim 4 with actuating means for imparting selective shifting movements to said clutch ring and toothed coupling collar.

6. The device as set forth in claim 4 wherein said spaced toothed coupling members are provided with axially extending inclined end surface teeth; axially extending inclined end surface teeth on said collar complementary to the teeth of said members adapted to ratchet therepast in one direction of rotation prior to meshing therewith; and means resiliently backing one of said members and permitting limited axial displacement of said one member during said ratcheting and until said collar and members are meshed.

7. In a vehicle wherein driving torque is transmitted from an engine driven clutch controlled transmission to drive axles, a drive axle housing; a differential in said housing; a pinion shaft rotatably mounted in said housing; a selectively actuated change speed mechanism adapted to operatively connect said pinion shaft and differential in a plurality of speed ratios without declutching the engine of said vehicle; a drive shaft rotatably mounted in said housing operatively connected to said engine driven transmission; and another selectively actuated change speed mechanism in said housing adapted to selectively connect said drive and pinion shafts in a plurality of different speed ratios without declutching the engine of said vehicle.

8. A coupling assembly comprising a housing; restraining means in said housing; securing means fixing said restraining means to said housing; a brake member non-rotatably slidably connected to said restraining means and having axially extending inclined end surface teeth; a rotatable collar selectively movable into and out of engagement with said brake member having axially extending inclined end surface teeth adapted to ratchet past the teeth of said member in one direction of rotation prior to meshing therewith; means operatively connected between said securing means and brake member permitting limited axial movement of said brake member during said ratcheting; and means resiliently backing said brake member and resiliently biasing said brake member toward said collar.

9. A coupling assembly comprising a housing; restraining means in said housing; securing means fixing said restraining means to said housing, a brake member non-rotatably slidably connected to said restraining means and having axially facing inclined end surface teeth; guide means mounted on said securing means; connecting means mounted for sliding movements on said guide means and operatively connected to said brake member; a rotatable collar selectively movable into and out of engagement with said brake member having axially extending inclined end surface teeth adapted to ratchet past the teeth of said member in one direction of rotation prior to meshing therewith; and means resiliently backing said connecting means and permitting axial displacement of said connecting means and collar during such ratcheting and until said collar and member are meshed.

10. A coupling assembly comprising a housing; a splined ring; securing means fixing said ring to said housing; a brake member having axially extending inclined end surface teeth and splines engaging the splines of said ring to permit non-rotatable sliding movements of said brake member with respect to said housing, and connecting means mounted for sliding movements between predetermined positions on said securing means operatively connected to said brake member; a rotatable collar selectively movable into and out of engagement with said brake member and having axially extending inclined end surface teeth adapted to ratchet past the teeth of said member in one direction of rotation prior to meshing therewith; and means resiliently backing said connecting means and permitting limited axial displacement of said connecting means and brake member together during such ratcheting and until said collar and member are meshed.

11. A coupling device comprising a housing; an internally splined ring; a plurality of bolts fixing said ring to said housing; guide sleeves mounted intermediate said ring and the heads of said bolts to space said heads from said ring and define a pair of limit positions; a brake member having axially extending inclined end surface teeth and external peripheral splines engaging the splines of said ring to non-rotatably slidably mount said member in a said housing, connecting means mounted on said sleeves for sliding movements between said limit positions operatively connected to said brake member; a rotatable collar selectively movable into and out of engagement with said brake member having axially extending inclined end surface teeth adapted to ratchet past the teeth of said member in one direction of rotation prior to meshing therewith; and means resiliently backing said connecting means and permitting axial displacement of said connecting means and collar between said limit positions during such ratcheting and until said collar and member are meshed.

12. The device as set forth in claim 11 wherein said brake member is provided with a peripheral groove; and said connecting means comprises a ring mounted in said groove in surrounding relation to said member and slidably mounted on said guide sleeves whereby axial movements of said connecting means is imparted to said member.

13. The device as set forth in claim 11 wherein said resilient means comprises a plurality of coil springs mounted in said splined ring and operatively engaging said connecting means to bias said connecting means and brake member toward said collar.

14. In a multi-speed drive axle assembly, an axle housing enclosing a rotatably mounted differential mechanism, means within said housing providing a selective multi-speed drive input to said differential mechanism, a pinion shaft rotatably mounted on said housing in operative drive connection with said selective multi-speed drive input, an engine driven drive input shaft rotatably mounted on said housing coaxial with said pinion shaft, and means providing a selective multi-speed drive coupling between said drive input and pinion shafts.

15. The multi-speed drive axle assembly defined in claim 14, wherein said selective multi-speed drive coupling comprises planetary two speed gearing embodying shiftable coupling means surrounding and operatively connecting the adjacent ends of said drive input and pinion shafts.

16. In a vehicle drive axle assembly, an axle housing, axle shaft connected differential mechanism journalled within said housing, a cross shaft journalled in said housing vertically displaced from and on an axis parallel to the axis of rotation of said differential mechanism, a pinion shaft journalled in said housing with its axis at an angle to the cross shaft axis, cooperating gearing and clutch means on said pinion shaft, cross-shaft and differential mechanism providing a selective two speed double reduction drive between the pinion shaft and said differential mechanism, an engine driven shaft journalled on said housing, and a selective two speed planetary gear assembly operatively interconnecting said engine driven and pinion shafts.

17. In a two speed transmission having no neutral condition, a support, two axially spaced relatively rotatable toothed members each associated with a different speed ratio mechanism in said transmission and each having a coaxial row of teeth extending toward the other, a relatively rotatable collar disposed between said members and having on opposite sides coaxial rows of teeth extending toward the adjacent member, means mounting said collar for shift between one selective speed ratio position where said collar has the teeth on one side meshed in torque transmitting engagement with the teeth of the adjacent member and a second selective speed ratio position where said collar has the teeth on its other side meshed in torque transmitting engagement with the teeth of the adjacent member, means for shifting said collar in opposite directions toward one or the other of said positions, said teeth on the said members and collar all having axially directed faces which are inclined at an acute angle and in the same direction with respect to the axis of said members and collar, means mounting one of said members slidably and non-rotatably on said support for axial displacement away from the other member and away from a normal position corresponding to that which it occupies in its selective speed ratio mesh position, means providing a radial extension on said one member independently slidably and non-rotatably connected to said support and defining limits of axial displacement of said one member and resilient means backing said radial extension for permitting such displacement and constantly urging return of said one member to said normal position.

18. In the transmission defined in claim 17, said radial extension comprising a ring axially fixed on said one member and axially slidably connected to said support between two fixed stops on said support.

References Cited in the file of this patent

UNITED STATES PATENTS

| | | |
|---|---|---|
| 2,183,667 | Buckendale | Dec. 19, 1939 |
| 2,326,754 | Buckendale | Aug. 17, 1943 |
| 2,617,316 | Randol | Nov. 11, 1952 |
| 2,666,337 | Brownyer | Jan. 19, 1954 |
| 2,730,914 | Rockwell | Jan. 17, 1956 |